United States Patent [19]

Reed

[11] Patent Number: 4,760,594
[45] Date of Patent: Jul. 26, 1988

[54] ANSWER SUPERVISION DETECTION UNIT FOR PAY TELEPHONE SYSTEM

[76] Inventor: Jerry K. Reed, 412 Cottonwood Pl., Boca Raton, Fla. 33431

[21] Appl. No.: 93,015

[22] Filed: Sep. 4, 1987

[51] Int. Cl.$^4$ ............................................ H04M 17/00
[52] U.S. Cl. ...................................... 379/154; 379/146
[58] Field of Search ............... 379/155, 154, 145, 146, 379/144, 91

[56] References Cited

U.S. PATENT DOCUMENTS

| | | | |
|---|---|---|---|
| 3,702,381 | 11/1972 | Halbedel et al. | 379/154 |
| 3,760,112 | 9/1973 | Busch | 379/154 |
| 4,010,328 | 3/1977 | McGuire | 379/154 |
| 4,076,962 | 2/1978 | Streisand | 379/146 |
| 4,323,733 | 4/1982 | Ott et al. | 379/146 |
| 4,439,636 | 3/1984 | Newkirk et al. | 379/144 |
| 4,517,412 | 5/1985 | Newkirk et al. | 379/144 |
| 4,567,325 | 1/1986 | Crouch et al. | 379/155 |
| 4,638,121 | 1/1987 | Clark, Jr. | 379/145 |
| 4,674,114 | 6/1987 | Crouch et al. | 379/154 |
| 4,698,840 | 10/1987 | Dively et al. | 379/112 |

Primary Examiner—Robert Lev
Attorney, Agent, or Firm—John Cyril Malloy

[57] ABSTRACT

In one embodiment, an answer supervision detection unit is disposed intermediate a tandem switch and the public switched network. Typically, the public switched network is two or four wire E & M lines or T1 lines. The E & M lines carry answer supervision information signals. The answer supervision detection unit monitors the E & M lines, detects the information signals, converts those information signals into coded answer supervision signals, and applies those coded signals to loop start lines that extend from the answer supervision detection unit to the tandem switch, the central office owned by the regional Bell operating system and the customer owned pay telephone. Intermediate the pay telephone and the central office is a decoder that senses the coded answer supervision signals (typically the A,B,C and D signals of the DTMF phone) and generates pseudo-answer supervision or strictly control signals to the customer owned pay telephone.

8 Claims, 2 Drawing Sheets

ANSWER SUPERVISION DETECTION UNIT FOR PAY TELEPHONE SYSTEM

BACKGROUND OF THE INVENTION

The present invention relates to an answer supervision detection unit for pay telephone systems which detects answer supervision information signals, converts those signals into coded signals and then places the signals on communication lines that run to customer owned pay telephones.

It is known in the industry that there are three general types of telephone communications lines. The first, loop start or ground start lines utilize two wires that couple the telephone to the central office. Customarily, the central office is owned by a regional Bell operating company. The second type of line is an E & M line. The E & M lines can be two or four wire communication lines. The third type of line is a T1 or "D" type communications line.

Due to the current regulatory and tariff regulations regarding pay telephones, all customer owned pay telephones must be connected by loop or ground start lines. Pay telephones owned by the regional Bell operating companies are provided coin collect and refund signals by the central office by changing the polarity of a voltage applied across tip and ground leads to the telephone thereby signaling that pay telephone that the outgoing call has been answered, that the outgoing call is seeking a response from a phone that is busy, or other types of answer supervision. However when a customer, other than a regional Bell operating company, owns the pay telephone, no answer supervision is passed from the central office of the operating company to the pay telephone. These customer owned telephone systems are sometimes called COCOTS which refers Customer Owned Coin Operated Telephone Systems or COPS which refers to Customer Owned Pay Stations.

For example, if a restaurant wished to own a pay telephone, the current regulations permit such ownership. However, when that customer owned pay telephone is connected to the central office, answer supervision to the phone by the central office is no longer provided in accordance with established tariffs. The inability to obtain answer supervision at the customer owned pay telephone can cause significant difficulties regarding obtaining payment for the use of the telephone from the user to the independently owned coin operated telephone.

For example currently, the user removes the hand set of the telephone off the hook and immediately hears dial tone. This is a characteristic of a loop start dial tone first line. The user then inserts a prescribed amount of money, such as a quarter. The user then dials the telephone number. In some COCOT pay phones, the telephone monitors the time from the completion of the dialing in order to determine whether to accept the quarter or to return the quarter to the user. Typically, most customer owned pay phones wait a time span approximately seven or 10 rings before accepting the quarter. If the user allows the phone to ring more than the predetermined time span, he will not be able to obtain the return of the quarter notwithstanding the fact his phone call was never answered. The same thing occurs with regard to a busy signal sent from the called end. If the user remains on the communications line long enough listening to the busy signal, the customer owned pay phone will accept his quarter and not return it since the phone simply times the length of the call to determine whether to accept or return the quarter.

Generally, this is not the case with pay phones owned by the Bell operating companies since those pay phones do coin collect or refund signals by way of the central office. Answer supervision signals are information signals sent over the public switched network that informs the central office that the call has been answered by the hand set being lifted off of the called telephone set. The central office then signals the Bell operating company pay telephone to collect or refund the coins.

This problem of determining when to accept payment is amplified when long distance calls are involved and the call is to be charged to the user's credit card or a significant amount of money is to be deposited into the phone to pay for a long distance call. Pay telephones are now in use that automatically charge the user's credit card after the user has electronically or manually input his credit number into the pay phone.

Sometimes COCOTS utilize a tandem telephone switch to achieve least cost routing of long distance telephone calls from the pay telephones owned by the COCOT. These tandem telephone switches are not usually equipped to pass answer supervision information signals coming from the called party back to the COCOT pay phones. In most cases, the calls pass through the tandem switch through the central office and then to the COCOT pay phone. Even if the tandem switch can pass any type of answer supervision, the central office blocks those answer supervision signals. In general, answer supervision on loop start telephone lines over long distances is very unreliable. On ground start lines, answer supervision is very limited. On the other hand, answer supervision on E & M lines and T1 type telephone lines is very good. Public switched networks carry long distance communications and typically use E & M lines or T1 lines. T1 telephone lines are simply digital multiplexed communications over a four wire E & M lines or like facilities. The difference between two wire E & M lines and four wire E & M lines is that four wire E & M lines operate in full duplex mode in that two wires exist for all outgoing information and two wires exist for all incoming information in addition to the E & M control lines.

OBJECTS OF THE INVENTION

It is an object of the present invention to provide coded answer supervision to customer owned coin operated telephones.

It is a further object of the present invention to provide answer supervision to COCOT pay telephones utilizing the loop start communication lines.

It is a further object of the present invention to provide answer supervision via the loop start lines intermediate the tandem telephone switch and the public switched network.

It is a further object of the present invention to provide answer supervision which is coded for dual tone multi-frequency (DTMF) telephones utilizing the tones not customarily used by the telephone system.

It is a further object of the present invention to provide answer supervision with a decoder intermediate the COCOT pay phone and the central office wherein the decoder operates in conjunction with an answer supervision conversion unit intermediate the tandem telephone switch and the public switched network.

SUMMARY OF THE INVENTION

In one embodiment, an answer supervision detection unit is disposed intermediate a tandem switch and the public switched network. Typically, the public switched network is two or four wire E & M lines or T1 lines. The E & M lines carry answer supervision information signals. The answer supervision detection unit monitors the E & M lines, detects the information signals, converts those information signals into coded answer supervision signals, and applies those coded signals to loop start lines that extend from the answer supervision detection unit to the tandem switch, the central office owned by the regional Bell operating system and the customer owned pay telephone. Intermediate the pay telephone and the central office is a decoder that senses the coded answer supervision signals (typically the A, B, C and D signals of the DTMF phone) and generates pseudo-answer supervision or strictly control signals to the customer owned pay telephone.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to an answer supervision detection system that senses answer supervision information signals, codes them, and cooperates with a decoder intermediate a central office and a COCOT pay telephone.

Figure 1:
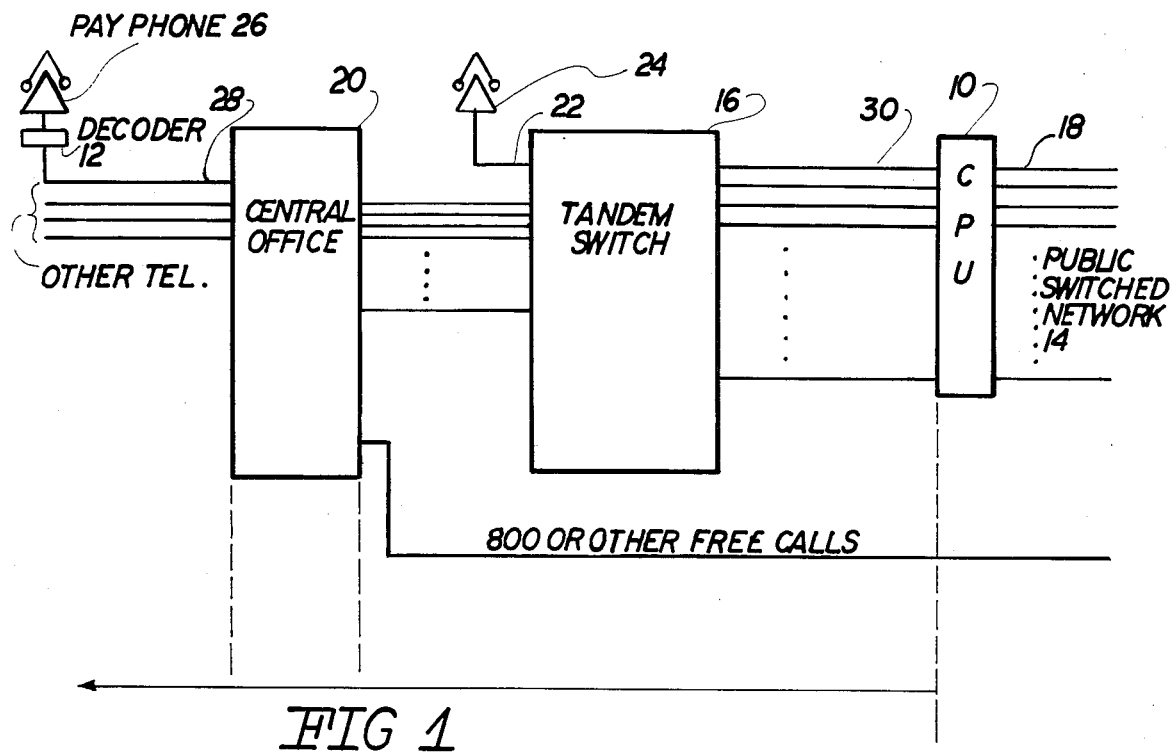
FIG. 1 illustrates, in block diagram form, the answer supervision detection unit (ASDU) in a telephone system.

FIG. 1 illustrates, in block diagram form, such a system. The answer supervision sub-system includes answer supervision detection unit 10 and decoder 12.

Answer supervision detection unit (herein ASDU) 10 is connected on one side to a public switched network 14 and is connected on the other side to a tandem switch 16. Customarily, the tandem switch is owned by the COCOT operator. Tandem switch 16 directs long distance calls by least cost routing to public switched network 14. Public switched network 14 is customarily an E & M telephone communication lines or T1 telephone communications lines. Line 18 in FIG. 1 is illustrative of a two or four wire E & M line or a T1 line.

On the other side of tandem switch 16 a plurality of lines extending between the switch and a central office 20. The central office is typically owned by a regional Bell operating company or other similar type regional telephone company. An example of another regional telephone company is GTE. It is possible that one of the lines extending from tandem switch 16 is line 22 that runs a relatively short distance to a telephone 24. Telephone 24 most likely is a pay telephone owned by the COCOT. On the opposite side of central office 20 is a pay telephone 26 that has, uniquely associated with it, a decoder 12. Line 28 is a loop start telephone communications line as is currently required by tariff. Central office 20 is also connected to numerous other telephones that may or may not be COCOT pay telephones. If those other telephones are COCOT pay telephones, each such pay telephone has an associated decoder. Certain calls from pay telephone 26 are routed by central office 20 directly to the public switched network 14 bypassing tandem switch 16. Those calls are generally free calls such as those associated with "800" telephone numbers.

As stated earlier, the long distance carriers on the public switched network 14 customarily use two or four wire E & M lines or T1 lines. As is known, the E & M wires in each of these E & M lines carry supervision information signals that report the status of the call. In the absence of ASDU 10, tandem switch 16 would sense these answer supervision information signals and report back to the public switched network as appropriate, however tandem switch 16 would not pass those signals to central office 20 nor to pay phone 26.

In other words, when a user initiates a call at pay phone 26, first a dial tone is placed on the ear piece of the hand set of phone 26 by central office 20. The user deposits a prescribed amount of money and dials the number. Central office 20 passes the number and any other relevant information to tandem switch 16 and tandem switch 16 selects the least cost long distance carrier on public switched network 14. At the other end of the call, not illustrated in FIG. 1, the terminal end of the public switched network initiates certain answer supervision information signals typically back on the E & M wire pair of the E & M communications line. These signals may represent that the phone at the called end has been taken off the hook to be answered. This answer supervision information signal on the E & M wire pair is typically blocked by tandem switch 16 and, hence, no indication is provided to pay phone 26 that the called phone had been answered. ASDU 10 solves this problem by monitoring or detecting the condition on the E & M pair of line 18, converting that information into a coded answer supervision signal and placing that information on communications line 30 extending between ASDU 10 and tandem switch 16. Therefore, answer supervision signals are present whenever a communications link is established. As used herein, the term "a communications link is established" refers to an electronic linkage wherein ringing signals, voice representative signals, disconnect signals, busy signals or other telephone communication linkage signals are present between a calling phone, such as pay phone 26, and a called phone. The coded answer supervision signals are applied via tandem switch 16 and central office 20 to loop start line 28 running to pay phone 26. Decoder 12 decodes those answer supervision signals and applies on the loop start line 28 the appropriate answer supervision information signs thereby notifying pay phone 26 that the hand set at the called end has been lifted, that the called telephone is busy, or other significant information. Pay phone 26 will then accept the requisite amount of money if the called party has lifted the hand set at the called phone.

Figure 2:
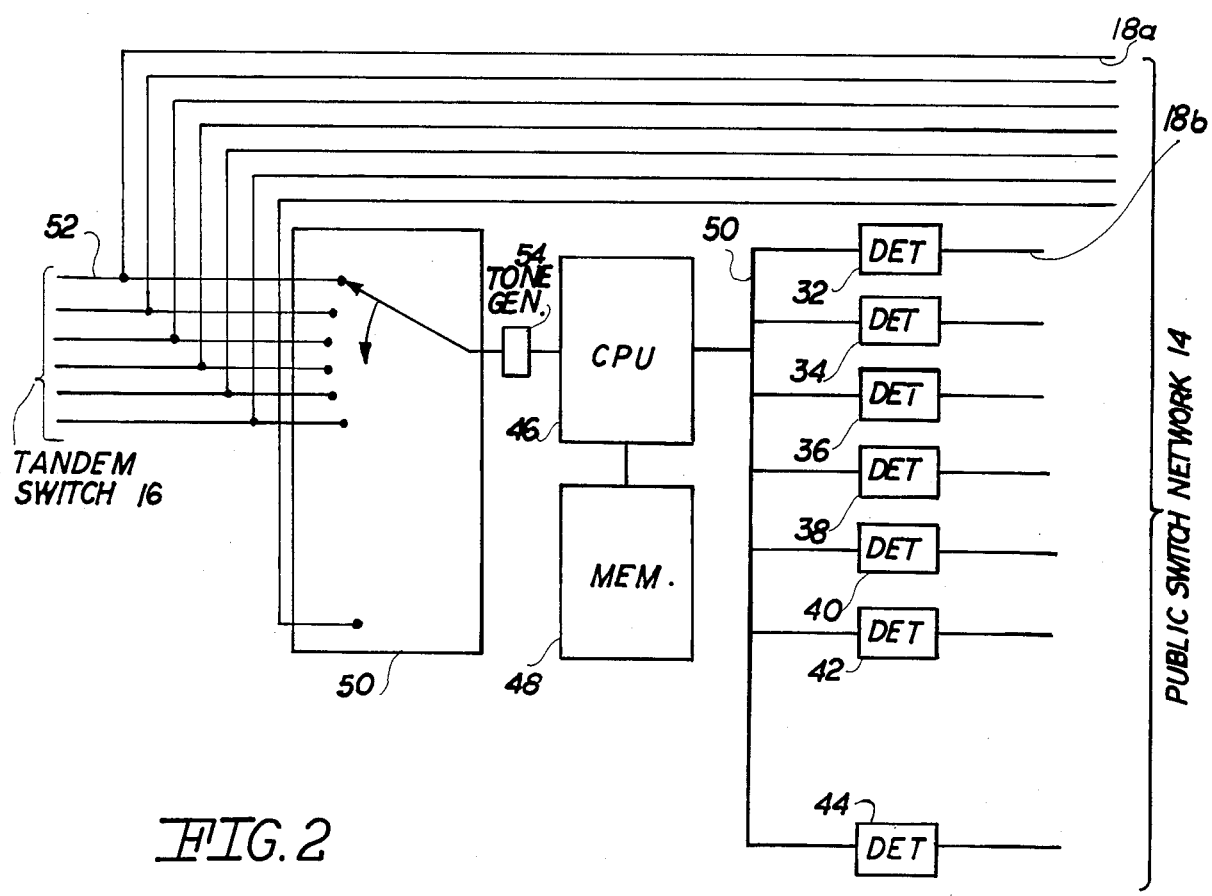
FIG. 2 illustrates, in block diagram form, a detail of the answer supervision detection unit.

FIG. 2 illustrates, in block diagram form, a more detailed presentation of ASDU 10. In this illustration, exemplary line 18 has been subdivided such that line 18a represents the ring and tip wires and line 18b represents the E & M wire pair. Detector 32 monitors E & M wire pair 18b. This monitoring occurs on other E & M wire pairs by detectors 34, 36, 38, 40, 42 and 44. In this embodiment, the ASDU 10 is embodied as an active microprocessor that includes central processing unit (CPU) 46 coupled to memory 48. Bus 50 links all of the detectors 32, 34, 36, 38, 40, 42 and 44 to CPU 46. Generally, CPU 46 polls the detectors and each detector has a status line indicating whether an answer supervision information signal has been sensed at its input. In the presence of an answer supervision information signal on E & M wire pair 18b, detector 32 raises a status flag, CPU 46 obtains the data, that is coded uniquely to the active microprocessor system, over bus 50, and determines which coded answer supervision signal is to be generated based upon information stored in memory 48. Memory 48 may be RAM or ROM. Tone generator 54 generates the appropriate DTMF tone. The output of generator 54 is applied through switch 50 that is diagrammatically illustrated in FIG. 2. Line 18a, representing the tip and ring wire pair, is coupled to line 52. Line 52 leads to tandem switch 16 and ultimately to pay phone 26. Generally, voice communications are passed through line 52 and line 18a. Switch 50 selects the proper communications line that is associated with each one of the E & M wire pair. The ASDU converts the answer supervision information signals on E & M wire pair 18b and in this instance instructs tone generator 54 to produce a DTMF tone signal corresponding to A, B, C or D. As is known in the industry, there are 16 tones in the DTMF set but only 12 tones are used by the telephone system. Therefore, the answer supervision detection sub-system utilizes the unused DTMF tones. The DTMF tones representing coded answer supervision signals are placed on line 52 based upon the movement of switch 50.

Figure 3:
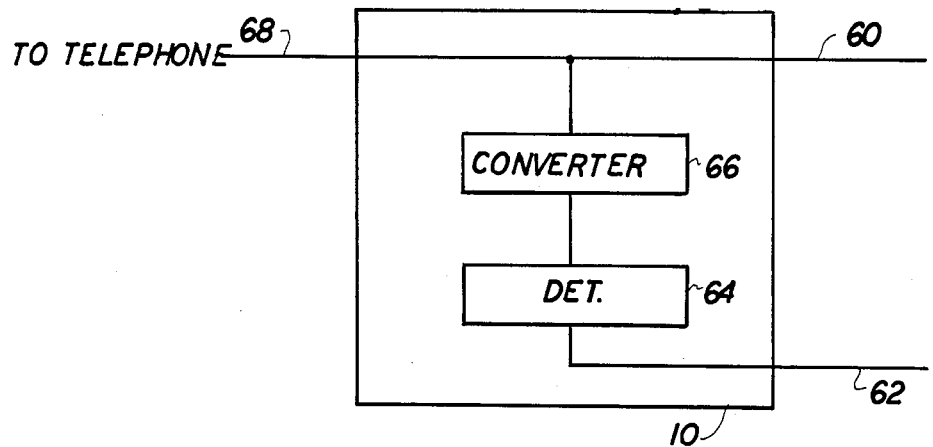
FIG. 3 diagrammatically illustrates the simplest form of the answer supervision detection unit.

FIG. 3 diagrammatically illustrates the most simple form of the ASDU 10. On one side of ASDU 10 is a first communications line 60 and a line carrying answer supervision information signals 62. In E & M lines, line 60 is the two or four wire set and line 62 is the E & M wire pair. Connected to the line carrying answer supervision information signals 62 is a detector 64. The output of detector 64 is connected to converter 66. Detector 64 detects the data on answer supervision information line 62 and converter 66 converts that data into a format compatible with a first communications line 60 and a second communications line 68. Lines 60 and 68 are connected together and customarily carry voice representative signals. The output of converter 66 is compatible with communications on lines 60 and 68.

Figure 4:
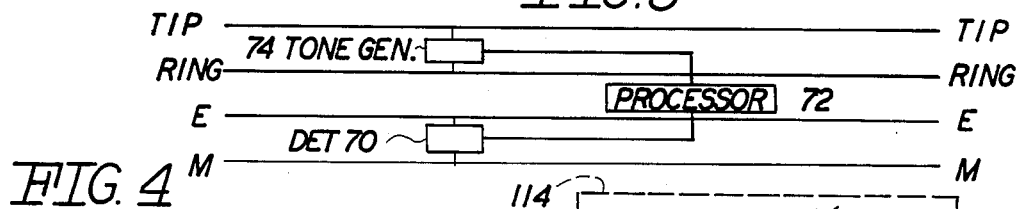
FIG. 4 illustrates a simple answer supervision detection unit for E & M communications lines.

FIG. 4 is a general illustration of an answer supervision conversion unit for a two wire E & M communications line. Detector 70 is coupled between the E wire and the M wire. Processor 72 is connected to detector 70 and generally monitors the detector and generates appropriate signals through tone generator 74. Tone generator 74 is connected between the tip and ring wires of the two wire E & M communications line.

Figure 5:
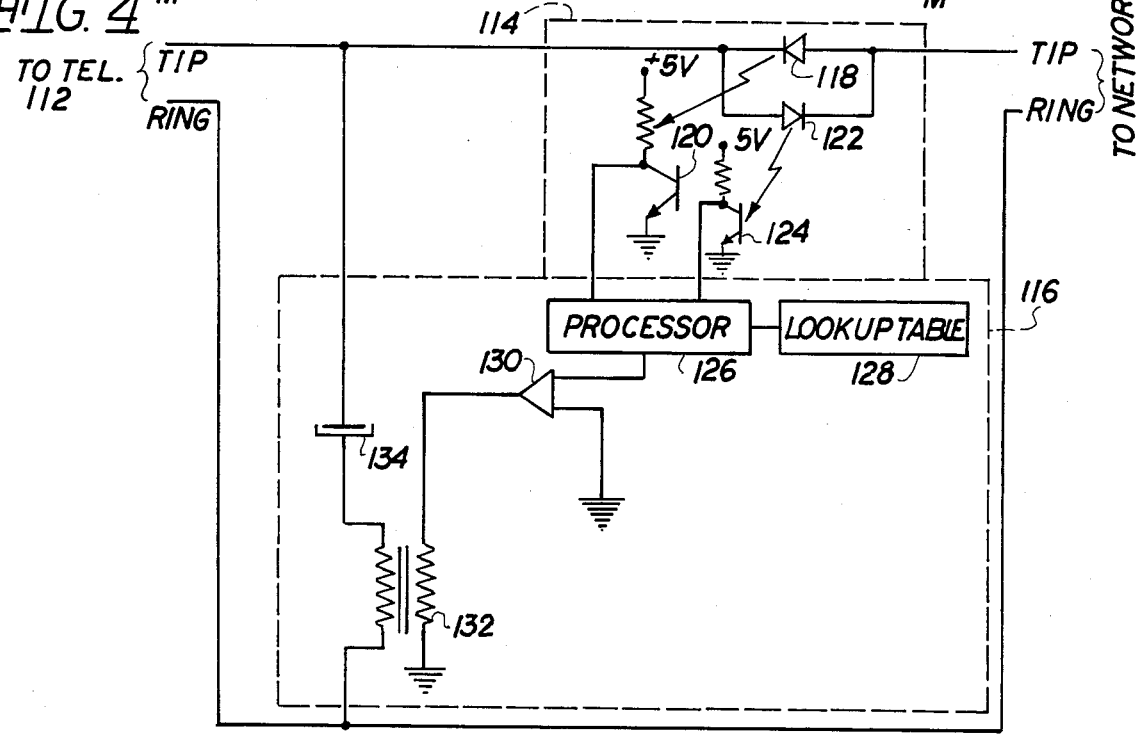
FIG. 5 illustrates, in block diagram form, an answer supervision detection unit for loop start lines.

FIG. 5 illustrates, in block diagram form, an ASDU operating in conjunction with a loop start or ground start telephone system. Although these types of systems are not customarily used, this embodiment of the answer supervision detection sub-system is a distinct possibility. In this alternative embodiment, the ASDU is connected in various fashions between the tip and ring wires. On the right hand side of FIG. 5 the tip and ring wires extend to network 110. On the left hand side of the drawing, the tip and ring wires extend to telephone 112. The item in the dashed lined box 114 is the detector for the ASDU whereas the item in the dashed line box 116 is the converter.

As is known to persons of ordinary skill in the art, current direction is changed on the tip wire and those changes and the duration of the current flows signify supervision information signals. In detector 114, light activated transistors made up of LED 118 and transistor 120 sense current flow in one direction whereas LED 122 and transistor 124 sense current flow in the other direction on the tip wire. The outputs of those transistors are monitored by a processor 126. Processor 126 operates in conjunction with look-up table 128. Based upon the direction and duration of the current flow and the switching of the current flow, processor 126 obtains the appropriate signals from look-up table 128 and applies them to tone generator/amplifier 130. Amplifier 130 drives transformer 132 which is connected to the tip line through coupling capacitor 134.

It is important to note that the central office is a class 4/5 or a class 5. That central office is shown in FIG. 1. The CPU chip illustrated in FIG. 2 can be a Z80 CPU, 8 bit computer chip manufactured by Zilog of Cupertino, Calif. It is thought that up to approximately 4,000 telephone communication lines can be monitored by a single CPU chip. A polling sequence is used by the CPU chip to monitor all the connected components and a multiplexed output is generated. The processor circuit could use an interrupt scheme. Approximately 6.1 milliseconds is provided to access each device; those devices include the detectors, the tone generator and the output switch. It is important to note that rather than using an active microprocessor as the ASDU, logic state circuitry could be used. Such logic state circuitry would include counters, latches and a ROM.

The decoder 12 in FIG. 1 can generate pseudo answer supervision signals to pay phone 26, i.e., by switching current, or can generate control signals directed to the phone hardware. In either case, a DTMF decoder is used in conjunction with a memory and an output driver.

The claims appended hereto are meant to cover these and other modifications and changes.

What is claimed is:

1. In a telephone system having a first communications line and a line carrying answer supervision information signals, both coupled to a public switched network, and a second communications line coupled to a coin operated pay telephone and wherein a communications link is established between said first communications line, said line carrying answer supervision information signals and said second communications line, an answer supervision conversion unit comprising:
    a detector means coupled to said line carrying answer supervision information signals for detecting said information signals; and
    a converter means coupled to said detector means for converting said information signals into coded answer supervision signals and for placing said coded answer supervision signals onto said second communications line.

2. In a telephone system as claimed in claim 1, said answer supervision conversion unit including a decoding means coupled intermediate said converter means and said pay telephone in said second communications line for decoding said coded answer supervision signals and for generating signals representative of said answer supervision information signals.

3. In a telephone system as claimed in claim 2, wherein said information signals include call answered signals and wherein said decoding means generates a call answered control signal in response thereto.

4. In a telephone system as claimed in claim 1 having a plurality of first communications lines and a corresponding plurality of lines carrying answer supervision information signals, said answer supervision conversion unit including:
  a plurality of detector means, a corresponding detector means coupled to a respective one of said plurality of lines carrying said information signals;
  said converter means including:
  means for monitoring said plurality of detector means and for converting said information signals detected by each corresponding detector means into a respective coded answer supervision signal; and
  means for applying said respective coded answer supervision signal onto said second communications line.

5. In a telephone system as claimed in claim 4 having a plurality of coin operated pay telephones and a plurality of second communications lines linked thereto, said converter means including means for selecting a respective one of said plurality of second communications lines corresponding to said respective one of said first communications lines in said established communications link and for placing said respective coded answer supervision signal thereon.

6. In a telephone system as claimed in claim 5, said answer supervision conversion unit including a plurality of decoding means, a corresponding one of said plurality of decoding means coupled to a respective one of said plurality of pay telephones via a corresponding second communications line, each decoding means for decoding said coded answer supervision signals and for generating signals representative of said answer supervision information signals.

7. In a telephone system as claimed in claim 6 wherein said information signals include call answered signals and wherein said decoding means generates a call answered signal in response thereto.

8. In a telephone system as claimed in claim 7 wherein said means for monitoring is a processing means coupled to a memory means, said processing means including means for polling said plurality of detector means, said plurality of detector means generating status signals and signals representative of the corresponding information signals detected thereby, said memory means for storing said coded answer supervision signals, said processing means including means for obtaining said signal representative of the detected information signals and obtaining a respective one of said coded answer supervision signals based upon the obtained detected information signal, said means for applying including a controllable outputting means coupled between said processing means and said plurality of second communication lines, said outputting means controlled by means for controlling included in said processing means and placing said coded answer supervision signals onto said respective one of said plurality of second communications based upon said processing means.

* * * * *